Sept. 5, 1967 W. NADOLNY 3,339,923
RACING GATE FOR MODEL CARS
Filed Sept. 22, 1964 2 Sheets-Sheet 1
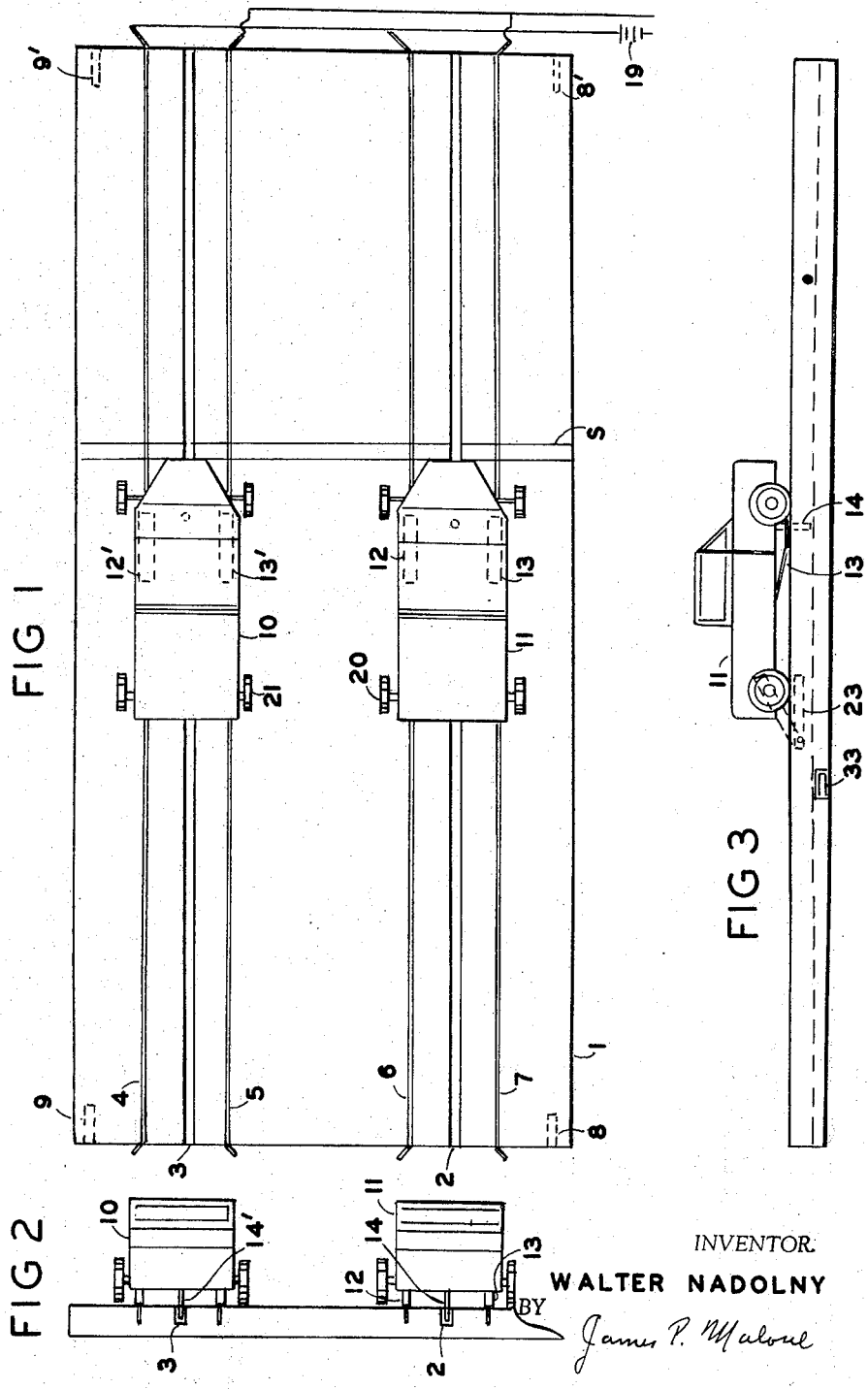
INVENTOR.
WALTER NADOLNY
BY
James P. Malone Sept. 5, 1967 W. NADOLNY 3,339,923
RACING GATE FOR MODEL CARS
Filed Sept. 22, 1964 2 Sheets-Sheet 2

INVENTOR.
WALTER NADOLNY
BY James P. Malone

United States Patent Office 3,339,923
Patented Sept. 5, 1967

3,339,923
RACING GATE FOR MODEL CARS
Walter Nadolny, 1089 Van Buren St.,
Uniondale, N.Y. 11553
Filed Sept. 22, 1964, Ser. No. 398,173
4 Claims. (Cl. 273—86)

This invention relates to model automobiles of the type having electrical tracks and electrical motors. More particularly, the invention relates to starting gates for racing such model vehicles.

Conventional electrical automobile systems generally have a parallel pair of tracks which are made out of a single molded plastic section. Each track comprises a slot and a pair of electrical rails spaced on either side of the slot. The electrical rails are used to supply electric power to contacts on the cars or vehicles. The slots are used to engage a pin on the vehicle for the purpose of keeping it on the track. The vehicles have rubber tires which ride on a smooth surface of the track.

In order to conduct races between the vehicles on the track, it is necessary to provide some starting gate device. The conventional starting gate which is used comprises rollers which are retractably mounted in the track. When the vehicles are started the driving wheels are placed on the rollers and the rollers are retracted simultaneously in order to start the vehicles at the starting gate. The difficulty with this type of starting gate is that it requires an aperture in the track for the rollers and each time the cars pass over the apertures, they bump the apertures.

The present invention provides a new type of starting gate means comprising a pair of levers pivotally mounted under the track adjacent to the starting line. The levers are adapted to rotate up through the guide slots to lift the driving wheels or the electric contact portion of the vehicles off the track. Means are provided to trip the lever to retract them and make the driving wheels or the electrical contacts of both cars to contact the surface of the track simultaneously to provide a start. The present starting gate does not interfere with the surface of the track in any manner which would affect cars running on the track.

Accordingly, a principal object of the invention is to provide new and improved electrical model vehicle track means.

Another object of the invention is to provide new and improved starting gate means for electrical model vehicles.

Another object of the invention is to provide new and improved starting gate means for racing model automobiles or the like comprising lever means for lifting part of the automobile off the track and means to trip the levers to put both automobiles in contact with the track simultaneously for a racing start.

These and other objects of the invention will be apparent from the following specification and drawings of which:

FIGURE 1 is a top view of an embodiment of the invention.

FIGURE 2 is an end view of FIGURE 1.

FIGURE 3 is a side view of FIGURE 1.

Figure 4:
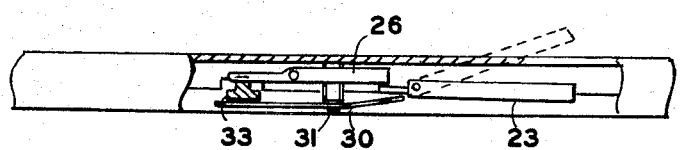
FIGURE 4 is a side view cut away to illustrate the starting gate of the present invention.

Referring to the figures, the track comprises a single molded piece 1, which has a pair of slots 2 and 3, which are adapted to engage guide pins 14 and 14' on the vehicles 10 and 11 which are conventional. A first pair of electrical rails 4 and 5 are provided on one track and a second pair of rails 6 and 7 are provided on the other track. The electrical rails are connected to a source of electricity 19.

The track sections have pin holes 8, 8', 9 and 9', which are used to connect the track sections together. The electrical rails have extending tabs at the end of the track sections for connecting the rails of the different sections together. The vehicles are shown mounted on starting line S.

The vehicles are conventional and have electric motors which are energized through contacts 12, 13 and 12' and 13' which are adapted to ride along the rails. The rear wheels 20 and 21 are generally the driving wheels.

Figure 5:
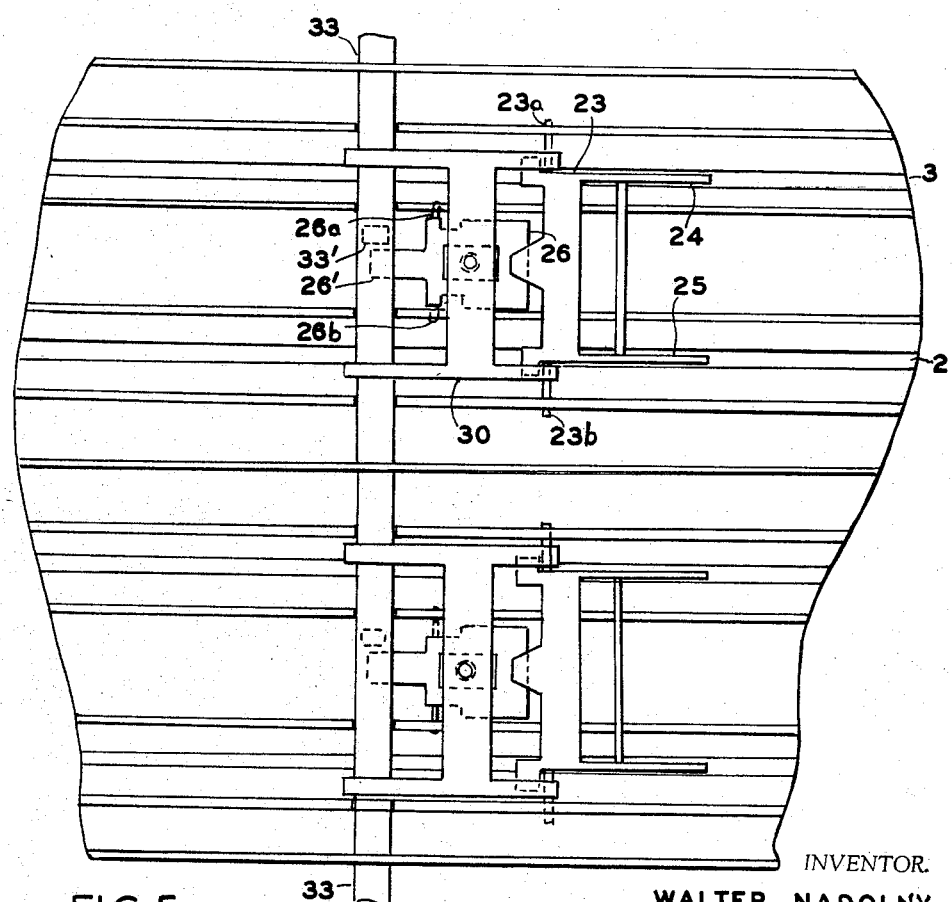
FIGURE 5 is a bottom view of FIGURE 4.

Referring also to FIGURES 4 and 5, the present starting gate means generally comprises a lever means 23 which has two lever portions 24 and 25 which are adapted to rotate upwardly through the guide slots 2 and 3. The lever means 23 is pivotally mounted by means of pins 23a and 23b which rest in holes in reinforcing ribs on the underside of the track. The lever means 23 is adapted to be actuated by a second lever 26, which is similarly mounted by means of pins 26a and 26b which are mounted in holes of a solid portion or rib in the bottom of the track. A spring member 30 which has a general H-shape is secured by the bottom of the track by means of the screw 31 and it presses upon the lever member 26 and 23 in the direction to cause the lever member 23 to be in the retracted position which is the full line position shown in FIGURE 4, the dotted position being the raised position.

FIGURE 5 shows a four track starting arrangement. The two tracks have a similar means actuated by the same sliding cam 33.

A sliding cam 33 is slidably mounted under the track and extends through slots in the sides thereof. It is held up against the underside of the track by means of portions of the spring 30. The sliding member 33 has a cam portion 33' which is adapted to contact the portion 26' of the member 26 when the sliding member is pushed in under the track. When this happens the member 26 rotates clockwise, FIGURE 4, and causes the lever member 23 to rotate counter-clockwise about the pivot point of pins 23a and 23b, causing the levers 24 and 25 to elevate and lift a portion of the vehicles off the track. The starting line can be located so that the portion of the vehicle which is raised can be either the rear portion so that the driving wheels can be raised off the track or it can be the front portion so that the electrical sliding contacts 12 and 13 will be raised off the track. In either event, when the sliding member 33 is pulled out the levers will be retracted and the vehicles will come into full contact with the track simultaneously thereby providing a good racing start. Other equivalent cam means may be used for instance, a rotatable cam.

Many modifications may be made by those who desire to practice the invention without departing from the scope thereof which is defined by the following claims:

I claim:
1. Starting gate means for racing model automobiles comprising:
   a track of the type having electrical rails and guide slots parallel to said rails,
   a pair of lever means pivotally mounted under said track adjacent a starting line on said track,
   said lever means being mounted to rotate up through said guide slots into contact with automobiles on said track to lift the driving wheels of said automobiles on said track off the surface of said track,
   and means to trip said lever means to retract said lever means simultaneously and permit said driving wheels of said automobiles to contact said track surface.

2. Starting gate means for racing model automobiles comprising:
   a track of the type having electrical rails and guide slots, a pair of lever means pivotally mounted under said track adjacent a starting line on said track, said lever means being mounted to rotate up through said guide slots to lift at least a portion of said automobiles off the surface of said track, and means to trip said lever means to retract said lever means simultaneously and permit automobiles on said track to contact said track surface.

3. Starting gate means for racing model automobiles comprising:

a track of the type having electrical rails and guide slots, a pair of lever means pivotally mounted under said track adjacent a starting line on said track, said lever means being mounted to rotate up through said guide slots to lift the driving wheels of automobiles on said track off the surface of said track, means to trip said lever means to retract said lever means simultaneously and permit said driving wheels of said automobiles to contact said track surface comprising;

a spring mounted under said track, said spring being connected to hold said lever means in retracted position, and movable cam means for raising said lever means against the force of said spring through said slots.

4. Starting gate means for racing model automobiles comprising:

a track of the type having electrical rails and guide slots, lever means pivotally mounted under said track adjacent a starting line on said track, said lever means being mounted to rotate up through said guide slots to lift the driving wheels of automobiles on said track off the surface of said track, and means to retract said lever means simultaneously and permit said driving wheels of said automobiles to contact said track surface.

References Cited

UNITED STATES PATENTS

| | | | |
|---|---|---|---|
| 2,306,049 | 12/1942 | Fernandez | 273—86 X |
| 2,788,613 | 4/1957 | Gelfand et al. | 46—209 X |

FOREIGN PATENTS

| | | |
|---|---|---|
| 882,269 | 11/1961 | Great Britain. |

ANTON O. OECHSLE, *Primary Examiner.*

M. R. PAGE, *Assistant Examiner.*